(12) United States Patent
Kang et al.

(10) Patent No.: US 10,959,013 B2
(45) Date of Patent: Mar. 23, 2021

(54) PORTABLE AUDIO EQUIPMENT

(71) Applicant: LG ELECTRONICS INC., Seoul (KR)

(72) Inventors: Obyoung Kang, Seoul (KR); Sungwon Kim, Seoul (KR); Hyunsun Yoo, Seoul (KR); Seunghoon Lee, Seoul (KR); Donghan Kim, Seoul (KR); Joonseong Ha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 5 days.

(21) Appl. No.: 16/349,903

(22) PCT Filed: Nov. 14, 2017

(86) PCT No.: PCT/KR2017/012854
§ 371 (c)(1),
(2) Date: May 14, 2019

(87) PCT Pub. No.: WO2018/093111
PCT Pub. Date: May 24, 2018

(65) Prior Publication Data
US 2019/0313176 A1 Oct. 10, 2019

(30) Foreign Application Priority Data
Nov. 15, 2016 (KR) .................... 10-2016-0152013

(51) Int. Cl.
*H04R 1/10* (2006.01)
*B06B 1/02* (2006.01)
(Continued)

(52) U.S. Cl.
CPC .............. *H04R 1/105* (2013.01); *B06B 1/02* (2013.01); *B06B 1/0223* (2013.01); *H04R 1/10* (2013.01);
(Continued)

(58) Field of Classification Search
CPC ........ H04R 1/105; H04R 1/10; H04R 1/1016; H04R 1/1041; H04R 5/0335; H04R 5/033;
(Continued)

(56) References Cited

U.S. PATENT DOCUMENTS

| 2013/0072834 | A1* | 3/2013 | Afshar | ..................... A61H 1/00 601/46 |
| 2016/0192060 | A1 | 6/2016 | Noertker et al. | |
| 2017/0372565 | A1* | 12/2017 | Do | ........................ B60W 50/16 |

FOREIGN PATENT DOCUMENTS

| KR | 10-0937159 B1 | 1/2010 |
| KR | 10-1250929 B1 | 4/2013 |

(Continued)

*Primary Examiner* — Yogeshkumar Patel
(74) *Attorney, Agent, or Firm* — Birch, Stewart, Kolasch & Birch, LLP

(57) ABSTRACT

Provided is a portable audio equipment comprising: a neckband-shaped housing having one side open; a vibration unit including a plurality of vibration modules provided in at least two regions corresponding to both sides of the housing; and a control unit for sensing a control signal including information on a vibration pattern for each of the plurality of vibration modules and controlling the plurality of vibration modules to output the vibration pattern, wherein the vibration pattern is related to event information that is generated in an external terminal device.

19 Claims, 16 Drawing Sheets

(51) Int. Cl.
*H04W 64/00* (2009.01)
*H04W 4/02* (2018.01)

(52) U.S. Cl.
CPC ......... *H04R 1/1016* (2013.01); *H04R 1/1033* (2013.01); *H04W 4/02* (2013.01); *H04W 64/006* (2013.01)

(58) Field of Classification Search
CPC .. H04R 1/02; H04R 2460/13; H04R 2420/07; H04R 1/1033; H04R 2400/03; H04W 52/0254; B06B 1/02; B06B 1/0223; G01H 3/00; G01H 11/06; G01H 1/12
See application file for complete search history.

(56) References Cited

FOREIGN PATENT DOCUMENTS

| | | | |
|---|---|---|---|
| KR | 101250929 B1 | * | 4/2013 |
| KR | 10-1366001 B1 | | 2/2014 |
| KR | 10-1377418 B1 | | 4/2014 |

* cited by examiner

FIG. 7
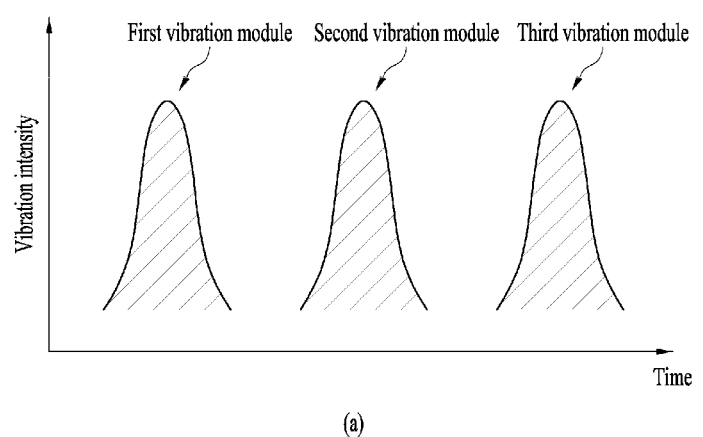
(a)
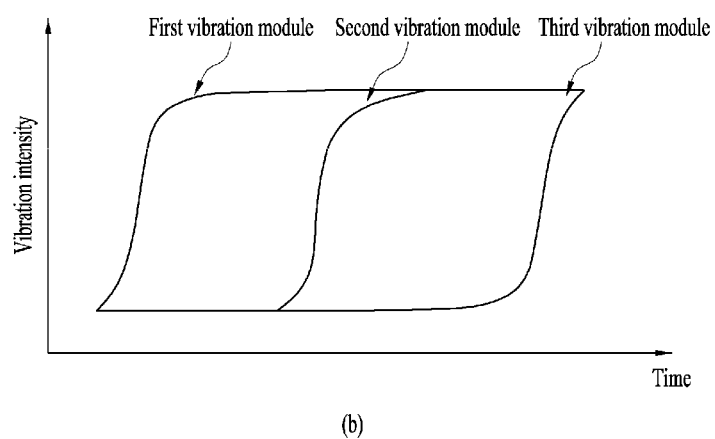
(b)

FIG. 10

| Number of vibration modules | Identification information | | Vibration pattern information (e.g., time-vibration intensity information) |
|---|---|---|---|
| | Identifier | Location information | |
| 2 | First vibration module | Left | CASE 1 |
| | Second vibration module | Right | |
| 3 | First vibration module | Left end | CASE 2 |
| | Second vibration module | Top end | |
| | Third vibration module | Right end | |

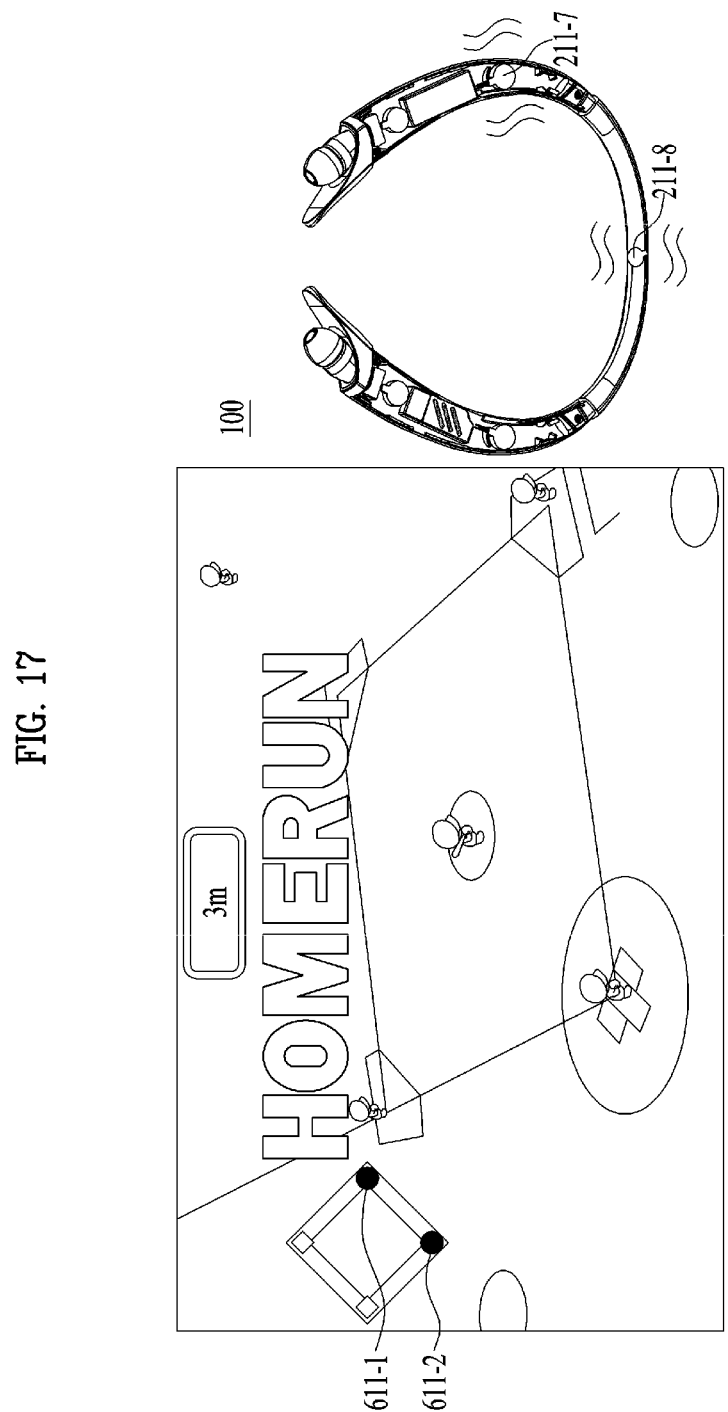

PORTABLE AUDIO EQUIPMENT

CROSS REFERENCE TO RELATED APPLICATIONS

This application is the National Phase of PCT International Application No. PCT/KR2017/012854, filed on Nov. 14, 2017, which claims priority under 35 U.S.C. 119(a) to Patent Application No. 10-2016-0152013, filed in the Republic of Korea on Nov. 15, 2016, all of which are hereby expressly incorporated by reference into the present application.

TECHNICAL FIELD

The present invention relates to a portable audio equipment for transmitting/receiving a sound signal to/from a terminal through wired or wireless communication with a terminal and transmitting a control signal for controlling the terminal according to a signal input through a user input unit.

BACKGROUND ART

Sound equipment refers to a sound device that receives sound signals from a terminal device and transmits sound information collected through a microphone to the terminal device. Conventionally, sound signals are received in a wired manner by plugging a terminal into an ear jack of the portable audio equipment. However, in view of mobility and user convenience, demand for portable audio equipment employing a wireless communication scheme is increasing.

Portable audio equipment designed in consideration of portability, such as headphone type equipment worn on a head in a band shape so as to be kept on a user's body, and ear-mount type equipment designed to be hung on ears, and ear-plug type equipment designed to be plugged into ears, is being developed.

Particularly, neckband-shaped portable audio equipment that can be hung around a user's neck is recently becoming popular. The neckband-shaped portable audio equipment allows the user to keep the earbuds in the portable audio equipment when it is not in use. In addition, it applies load to the user's shoulder or collarbone rather than to the user's ears or head. Accordingly, the neckband-shaped portable audio equipment is less burdensome.

Accordingly, the neckband-shaped portable audio equipment can hold a load up to a certain weight, and thus the battery capacity can be increased to a specific level.

In the present invention, a neckband-shaped portable audio equipment will be described in detail.

The neckband-shaped portable audio equipment may be provided with a vibration unit including a vibration module.

The vibration module refers to a minimum unit capable of generating vibration directly in the portable audio equipment and transmitting the vibration to a user. One vibration module may include one vibration motor.

Conventional neckband-shaped portable audio equipment generally has one vibration module.

In the case of the conventional neckband-shaped portable audio equipment, only whether to generate vibration and the period of generation of vibration can be controlled, and thus vibration patterns of distinguishable signal transmission techniques which can be transmitted to the user according to the control are limited.

The present invention discloses a neckband-shaped portable audio equipment having a plurality of vibration modules.

Particularly, with a neckband-shaped portable audio equipment that is open on one side, vibrations of vibration modules at a plurality of points can be distinguishably transmitted to the user, and thus more effects are expected.

DISCLOSURE OF THE INVENTION

Technical Task

It is an object of the present invention to address the above-mentioned issue of a limitation of vibration notification made by provision of only one vibration module in a portable audio equipment.

Technical Solutions

In one aspect of the present invention, provided herein is a portable audio equipment including a neckband-shaped housing opened on one side, a vibration unit including a plurality of vibration modules each provided in at least two areas corresponding to both sides of the housing, and a controller configured to recognize a control signal containing information about a vibration pattern for each of the plurality of vibration modules and control the plurality of vibration modules to output the vibration pattern, wherein the vibration pattern is related to information about an event generated in an external terminal device.

In an embodiment, the portable audio equipment may further include a wireless communication unit wirelessly connected to the external terminal device to receive data, wherein the control signal may be received from the external terminal device via the wireless communication unit.

In another embodiment, the control signal may contain vibration pattern information for each of the vibration modules according to the number of the vibration modules and identification information for identifying each of the vibration modules, wherein the identification information may include information about relative locations in the housing.

In another embodiment, the vibration pattern may include vibration intensity information corresponding to a time for each of the vibration modules.

In another embodiment, the vibration unit may include a left vibration module provided on a left side of the housing and a right vibration module provided on a right side of the housing, wherein the controller may selectively control the left vibration module and the right vibration module to vibrate according to the recognized control signal.

In another embodiment, the vibration unit may include a first vibration module and a second vibration module, wherein the controller may control the first vibration module and the second vibration module according to the recognized control signal such that the first vibration module outputs a first vibration pattern and the second vibration module outputs a second vibration pattern, wherein the second vibration pattern may be generated a first time after an end of the first vibration pattern.

In another embodiment, the first vibration pattern may correspond to a type of an event generated in the external terminal device and the second vibration pattern may correspond to counterpart information about the event generated in the external terminal device.

In another embodiment, the vibration unit may include a first vibration module, a second vibration module, and a third vibration module sequentially spaced apart from each other in a longitudinal direction of the housing, wherein the controller may control the first vibration module, the second vibration module, and the third vibration module according to the recognized control signal such that the first vibration module, the second vibration module, and the third vibration module sequentially vibrate in order of the first vibration module, the second vibration module, and the third vibration module or in order of the third vibration module, the second vibration module, and the first vibration module.

In another embodiment, the recognized control signal may include direction information, wherein the controller may determine a direction of the sequential vibration according to the direction information.

In another embodiment, the recognized control signal may contain a plurality of level values, wherein the controller may perform a control operation to change a vibration intensity or vibration period of the vibration pattern according to the plurality of level values.

In another embodiment, the event may be an event of reproducing a sound source, wherein a higher level value may be assigned to a higher frequency band of the reproduced sound source among the plurality of level values, and the vibration pattern may have a shorter vibration period for the higher level value.

In another embodiment, the event may be included in a navigation application, wherein, as an arrival time taken from a current location to a position at which a turn needs to be made to move on the navigation application decreases, a higher level value may be assigned, and the vibration pattern may have a shorter vibration period for the higher level value.

In another embodiment, the event may be included in a navigation application, wherein, as a require turn angle on the navigation application increases, a higher level value may be assigned, and the vibration pattern may have a higher vibration intensity for the higher level value.

In another embodiment, the controller may output a vibration pattern for sequentially vibrating a plurality of vibration modules in a direction corresponding to a required turn direction on the navigation application.

In another embodiment, the portable audio equipment may further include a location information module configured to sense change in location, wherein the control signal may vary a level value among the plurality of level values according to a degree of the change in location over time.

In another embodiment, as the degree of the change in location over time increases, a higher level value may be assigned.

In another embodiment, the portable audio equipment may further include a location information module configured to sense change in location, and a wireless communication unit wirelessly connected to the external terminal device to receive data, wherein the controller may receive, via the wireless communication unit, a light intensity measured by an illumination sensor provided in the external terminal device, wherein, when the measured light intensity is less than or equal to a preset value and a degree of the change in location over time is less than or equal to a preset value, the controller may output a vibration pattern having a vibration intensity less or equal to a preset value or a vibration period less or equal to a preset value.

In another embodiment, the controller may output a first vibration pattern when the event generated in the external terminal device satisfies a preset condition, and output a second vibration pattern when the event does not satisfy the preset condition.

In another embodiment, the external terminal device may include a plurality of external terminal devices, and the portable audio equipment may further include a wireless communication unit wirelessly connected or wirelessly connectable to the plurality of external terminal devices, wherein the vibration pattern may have a different vibration pattern depending on a wirelessly connected external terminal device among the plurality of external terminal devices or have a different vibration pattern depending on an activated external terminal device among the plurality of wirelessly connected external terminal devices.

In another embodiment, the portable audio equipment may further include a motion sensor configured to recognize an orientation, a location information module configured to recognize a location, and a wireless communication unit wirelessly connected to the external terminal device to receive data, wherein the controller may receive location information about the external terminal device having the generated event via the wireless communication unit, and control a vibration module located in a direction corresponding to the external terminal device having the generated event to output a vibration pattern, based on the location information about the external terminal device having the generated event, a location recognized through the location information module, and the orientation recognized through the motion sensor.

Advantageous Effects

The portable audio equipment according to the present invention has effects as follows.

According to at least one of the embodiments of the present invention, a notification by which the direction can be sensed may be provided through vibration of a vibration unit.

According to at least one of the embodiments of the present invention, even when the number of vibration modules of the vibration unit is different, a control signal having a compatible vibration pattern may be generated.

According to at least one of the embodiments of the present invention, information about an event generated through vibration of the vibration unit may be recognized.

Also, according to at least one of the embodiments of the present invention, a vibration intensity suitable for a situation may be output.

Further scope of applicability of the present invention will become apparent from the following detailed description. It should be understood, however, that the detailed description and specific embodiments, such as preferred embodiments of the invention, are given by way of illustration only, since various changes and modifications within the spirit and scope of the invention will become apparent to those skilled in the art.

DESCRIPTION OF DRAWINGS

FIG. 7 illustrates some embodiments of sequential vibration patterns of a plurality of vibration modules.

FIG. 10 is a conceptual diagram of control signals of the portable audio equipment associated with the present invention.

FIG. 17 illustrates a gaming view of an external terminal device related to the present invention and a vibration state of the portable audio equipment according to the gaming view.

BEST MODE FOR INVENTION

Figure 1:
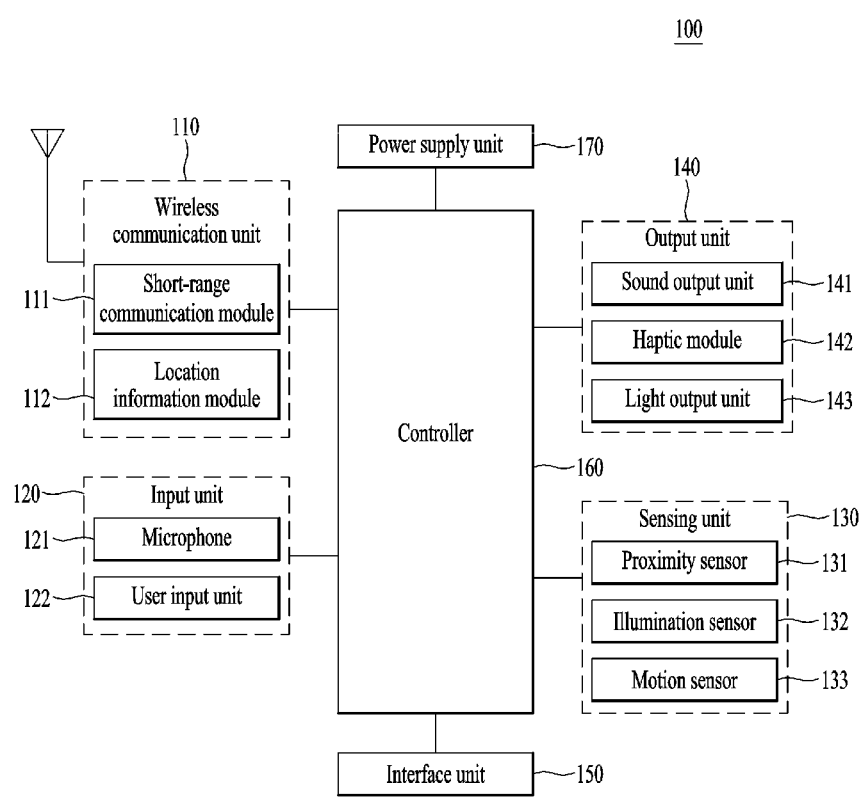
FIG. 1 is a block diagram of a portable audio equipment in accordance with the present invention.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present invention, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

Sound equipment refers to a sound device that receives sound signals from a terminal device and transmits sound information collected through a microphone to the terminal device. Conventionally, sound signals are received in a wired manner by plugging a terminal into an ear jack of the portable audio equipment. However, in view of mobility and user convenience, demand for portable audio equipment employing a wireless communication scheme is increasing.

Portable audio equipment designed in consideration of portability, such as headphone type equipment worn on a head in a band shape so as to be kept on a user's body, and ear-mount type equipment designed to be hung on ears, and ear-plug type equipment designed to be plugged into ears, is being developed.

Particularly, neckband-shaped portable audio equipment that can be hung around a user's neck is recently becoming popular. The neckband-shaped portable audio equipment allows the user to keep the earbuds in the portable audio equipment when it is not in use. In addition, it applies load to the user's shoulder or collarbone rather than to the user's ears or head. Accordingly, the neckband-shaped portable audio equipment is less burdensome.

Accordingly, the neckband-shaped portable audio equipment can hold a load up to a certain weight, and thus the battery capacity can be increased to a specific level.

In the present invention, a neckband-shaped portable audio equipment will be described in detail.

The neckband-shaped portable audio equipment may be provided with a vibration unit including a vibration module.

The vibration module refers to a minimum unit capable of generating vibration directly in the portable audio equipment and transmitting the vibration to a user. One vibration module may include one vibration motor.

Conventional neckband-shaped portable audio equipment generally has one vibration module.

In the case of the conventional neckband-shaped portable audio equipment, only whether to generate vibration and the period of generation of vibration can be controlled, and thus vibration patterns of distinguishable signal transmission techniques which can be transmitted to the user according to the control are limited.

The present invention discloses a neckband-shaped portable audio equipment having a plurality of vibration modules.

Particularly, with a neckband-shaped portable audio equipment that is open on one side, vibrations of vibration modules at a plurality of points can be distinguishably transmitted to the user, and thus more effects are expected.

FIG. 1 is a block diagram of a portable audio equipment 100 in accordance with the present invention.

The portable audio equipment 100 may include a wireless communication unit 110, an input unit 120, a sensing unit 130, an output unit 140, an interface unit 150, a controller 160, and a power supply unit 170.

The components shown in FIG. 1 are not essential for implementing a portable audio equipment, and the portable audio equipment described herein may have more or fewer components than the components listed above.

In addition, an external terminal device described below may also have more or fewer components than the listed components. Therefore, redundant description will be omitted.

More specifically, the wireless communication unit 110 may include one or more modules which enable communications such as wireless communications between the portable audio equipment 100 and a wireless communication system, communications between portable audio equipment 100 and another mobile terminal, communications between the portable audio equipment 100 and an external server. Further, the wireless communication unit 110 may include one or more modules which connect the portable audio equipment 100 to one or more networks.

The wireless communication unit 110 may include at least one of a short-range communication module 111 and a location information module 112. The wireless communication unit may include a mobile communication module or a wireless Internet module as needed.

The short-range communication module 111 is configured for short-range communications. The short-range communication module may support short-range communications using at least one of Bluetooth™, Radio Frequency Identification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

The short-range communication module 111 in general may support wireless communications between the portable audio equipment 100 and a wireless communication system, communications between the portable audio equipment 100 and another mobile terminal, or communications between the portable audio equipment 100 and a network where another mobile terminal (or an external server) is located, via wireless area networks. The wireless area networks may be wireless personal area networks.

The short-range communication module 111 may sense (or recognize) a terminal or the like capable of communication around the portable audio equipment 100. Further, when the sensed terminal is a device authenticated to communicate with the portable audio equipment 100 according to the present invention, the controller 160 may receive at least a part of the data processed in the mobile terminal via the short-range communication module 111. Therefore, the user of the portable audio equipment 100 may use the data processed in the terminal through a wearable device.

For example, according to this configuration, the user may perform a telephone conversation through the portable audio equipment 100 when the terminal or the like receives an incoming call.

The location information module 112 is configured to identify a location (current location) of the portable audio equipment 100. Typical examples of the location information module 112 include a Global Positioning System (GPS) module or a Wi-Fi module. As one example, when the portable audio equipment 100 uses the GPS module, a position of the portable audio equipment 100 may be acquired using a signal sent from a GPS satellite. As another example, when the portable audio equipment 100 uses the Wi-Fi module, a position of the portable audio equipment 100 may be acquired based on information related to a wireless access point (AP) which transmits or receives a wireless signal to or from the Wi-Fi module. If necessary, the location information module 112 may alternatively or additionally perform a function of any of the other modules of the wireless communication unit 110 to obtain data about the position of the portable audio equipment 100. The location information module 112 is used to obtain the location (or current location) of the portable audio equipment 100 and is not limited to a module that directly calculates or acquires the location of the portable audio equipment 100.

The input unit 120 may include a microphone 121 for inputting an audio signal, and a user input unit 122 (e.g., a touch key, a push key, a mechanical key, and the like) for receiving information input by a user. Audio data or image data obtained through the input unit 120 may be analyzed and processed into a control command of the user.

The user input unit 122 is used for the user to control the portable audio equipment 100. Examples of the user input unit 122 may include a call button, a button for volume control, a power button, and a storage button for storing the sound cable in the main body.

The user input unit 122 may include a call button, a pair of volume control buttons, and may further include a play/stop button and a music play order change button.

The size of the portable audio equipment 100 is limited and the user often provides inputs without directly seeing the user input unit 122. Accordingly, if the number of buttons is large, it is difficult to distinguish between the functions of the respective buttons. Therefore, the control commands that can be input may be extended using a limited number of buttons by combining the time for which a button is pressed, the number of times the button is pressed, and a plurality of buttons.

The microphone 121 processes an external sound signal into electrical voice data. The processed voice data may be utilized according to a function being performed (or an application program being executed) on the portable audio equipment 100 or may be transmitted to an external terminal or an external server via the wireless communication unit 110. Various noise reduction algorithms for eliminating noise generated in the process of receiving an external sound signal may be implemented in the microphone 122.

The sensing unit 130 may include one or more sensors configured to sense at least one of internal information of the portable audio equipment 100, information about the surrounding environment of the mobile terminal, and user information. For example, the sensing unit 130 may include at least one of a proximity sensor 131, an illumination sensor 132, a touch sensor, an acceleration sensor, a magnetic sensor, a G-sensor, a gyroscope sensor, a motion sensor 133, an RGB sensor, an infrared (IR) sensor, a finger scan sensor, a ultrasonic sensor, an optical sensor, a microphone 121, a battery gauge, an environment sensor (e.g., a barometer, a hygrometer, a thermometer, a radioactivity sensor, a thermal sensor, a gas sensor, etc.), and a chemical sensor (e.g., an electronic nose, a healthcare sensor, a biometric sensor, etc.). The portable audio equipment disclosed herein may combine and utilize information from two or more of the sensors.

In particular, the sensing unit may include a sensor configured to sense whether an earphone, which will be described later, is positioned in the holder. A magnetic sensor or the like may be typically applied to such a sensor.

The output unit 140 is configured to generate an output related to visual, auditory, or tactile sensing, and may include at least one of a sound output unit 141, a haptic module 142, or a light output unit 143.

The sound output unit 141 is a device for outputting sound according to a sound signal. Typical examples of the sound output unit may include an earphone plugged into a user's ear to transmit sound and a speaker configured to output sound without the earphone connected.

The haptic module 142 may include the concept of a vibration unit or a vibration module, which will be described later.

The interface unit 150 serves as a channel to various kinds of external devices connected to the portable audio equipment 100. The interface unit 150 may include at least one of an external charger port or a wired/wireless data port. The portable audio equipment 100 may perform appropriate control related to an external device according to connection of the external device to the interface unit 150.

The control unit 160 typically controls the overall operation of the portable audio equipment 100 in addition to the operations related to the application program. The controller 160 may process a signal, data, information, or the like that is input or output through the above-described components.

The power supply unit 170 is configured to receive external power or internal power under control of the controller 160 to supply appropriate power to components included in the portable audio equipment 100. The power supply unit 170 may include a battery. The battery may be a built-in battery or a disposable battery.

At least part of the components may be operated cooperatively to implement an operation, control or a control method of the mobile terminal in accordance with various embodiments of the present invention.

Figure 2:
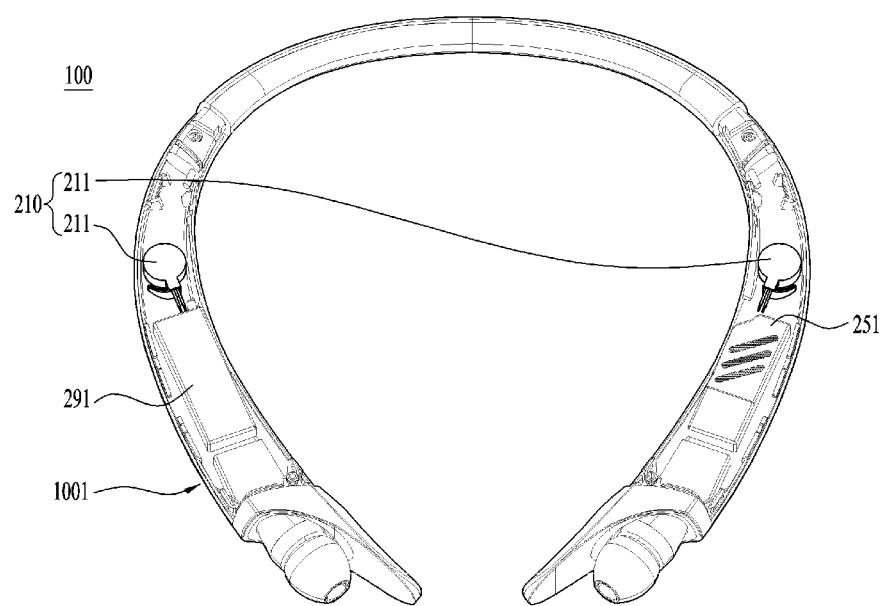
FIG. 2 is a partial cross-sectional view of the portable audio equipment related to the present invention.

FIG. 2 is a partial cross-sectional view of the portable audio equipment 100 related to the present invention.

A housing 1001 of the portable audio equipment 100 defines the overall appearance and also forms a mount portion. As mentioned above, the present invention will be described, focusing only on the neckband-shaped portable audio equipment 100. However, the present invention is not limited to the neckband-shaped portable audio equipment 100, but may be applied to other portable devices without departing from the spirit of the present invention.

That is, as long as a device is provided with a plurality of vibration modules 211 and is capable of transmitting/receiving a signal to/from other external terminal devices, the features of the present invention can be applied thereto.

For example, at least some features of the present invention may be applied even to an earring-shaped earphone connected to a terminal if the earphone has a plurality of vibration modules 211 provided in an earring-shaped housing 1001.

Basically, a controller configured to perform an operation for sound reproduction, a speaker 251 configured to output sound, a user input unit configured to receive user input, and a power supply unit 291 configured to supply power for driving of the apparatus may be provided in the housing 1001.

The housing 1001 may be provided in a neckband shape while being open on one side.

The vibration unit 210 may be arranged in a mount portion formed by the housing 1001. In particular, the vibration unit 210 may include a plurality of vibration modules 211. Since the meaning of the vibration modules 211 has been described above, a detailed description thereof will be omitted.

The plurality of vibration modules 211 may be mounted in the housing 1001 so as to be spaced apart from each other. Arrangement of the vibration modules 211 spaced apart from each other may mean that the user can recognize that the vibrations of the vibration modules 211 are different from each other.

The plurality of vibration modules 211 of the vibration unit 210 may be vibrated under control of one controller. That is, the plurality of vibration modules 211 may vibrate regularly in an interrelation with each other. This operation may be defined as a vibration pattern of the vibration unit 210.

—Embodiments of Vibration Module Arrangement—

Figure 3:
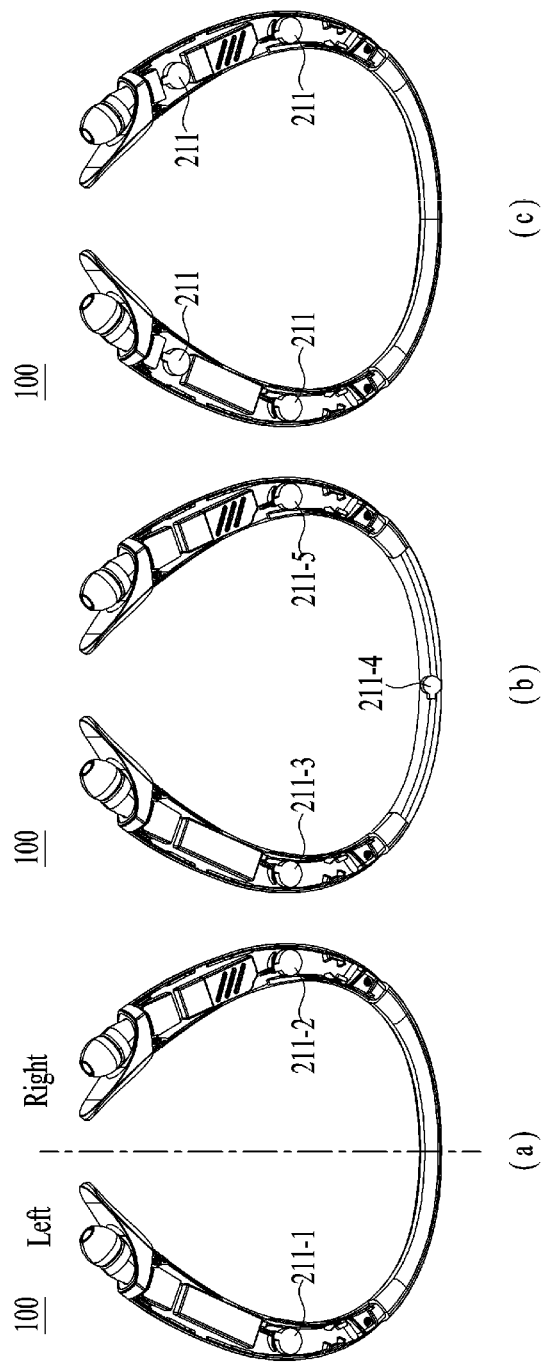
FIG. 3 is some embodiments of arrangement of vibration modules of the portable audio equipment associated with the present invention.

FIG. 3 is some embodiments of arrangement of vibration modules 211 of the portable audio equipment 100 associated with the present invention.

FIG. 3(a) illustrates a case where two vibration modules 211 are provided, FIG. 3(b) illustrates a case where three vibration modules 211 are provided, and FIG. 3(c) illustrates a case where four vibration modules 211 are provided.

The number of the plurality of vibration modules 211 arranged spaced apart from each other may be two or three or more. While FIG. 3 illustrates cases where two, three, or four vibration modules 211 are provided, more vibration modules 211 may be provided as needed.

The housing 1001 of the portable audio equipment is arranged in a bilaterally symmetrical form, and it may be divided into left and right imaginary areas. The left and right areas may be divided as shown in FIG. 2, but the left and right sides may be switched depending on how the user wears the equipment.

The plurality of vibration modules 211 may be distributed to at least two areas of the housing 1001 on the left and right sides.

Each of the vibration modules 211-1 and 211-2 arranged on both the left and right sides may separately generate vibration in the left area and vibration in the right area.

The left vibration module 211-1 and the right vibration module 211-2 may be applied not only to the case of FIG. 2(a) but also to those of FIG. 2(b) and FIG. 2(c).

Referring to FIG. 3(b), when three vibration modules 211 are provided, two of the three vibration modules 211 may be disposed on the left and right sides, respectively, and the other one may be disposed in the middle.

Referring to FIG. 3(c), when four vibration modules 211 are provided, two vibration modules 211 may be disposed in the left area of the housing 1001, and the other two vibration modules 211 may be disposed in the right area of the housing 1001.

The specific locations of the modules may be varied depending on the conditions of other components, but the locations may be arranged so as to be bilaterally symmetrical. This is intended to correctly provide the user with a specific vibration pattern.

Assuming that the housing 1001 has a neckband shape, the plurality of vibration modules 211 may be spaced apart from each other in the longitudinal direction with respect to the circumferential direction surrounding a neck. If the modules are arranged in the thickness or the width direction of the housing 1001, a sufficient distance of spacing cannot be secured, and thus vibrations may not be distinguishably transmitted to the user. Accordingly, it is appropriate to arrange the modules in the longitudinal direction.

—Embodiment of Vibration Pattern—

Figure 4:
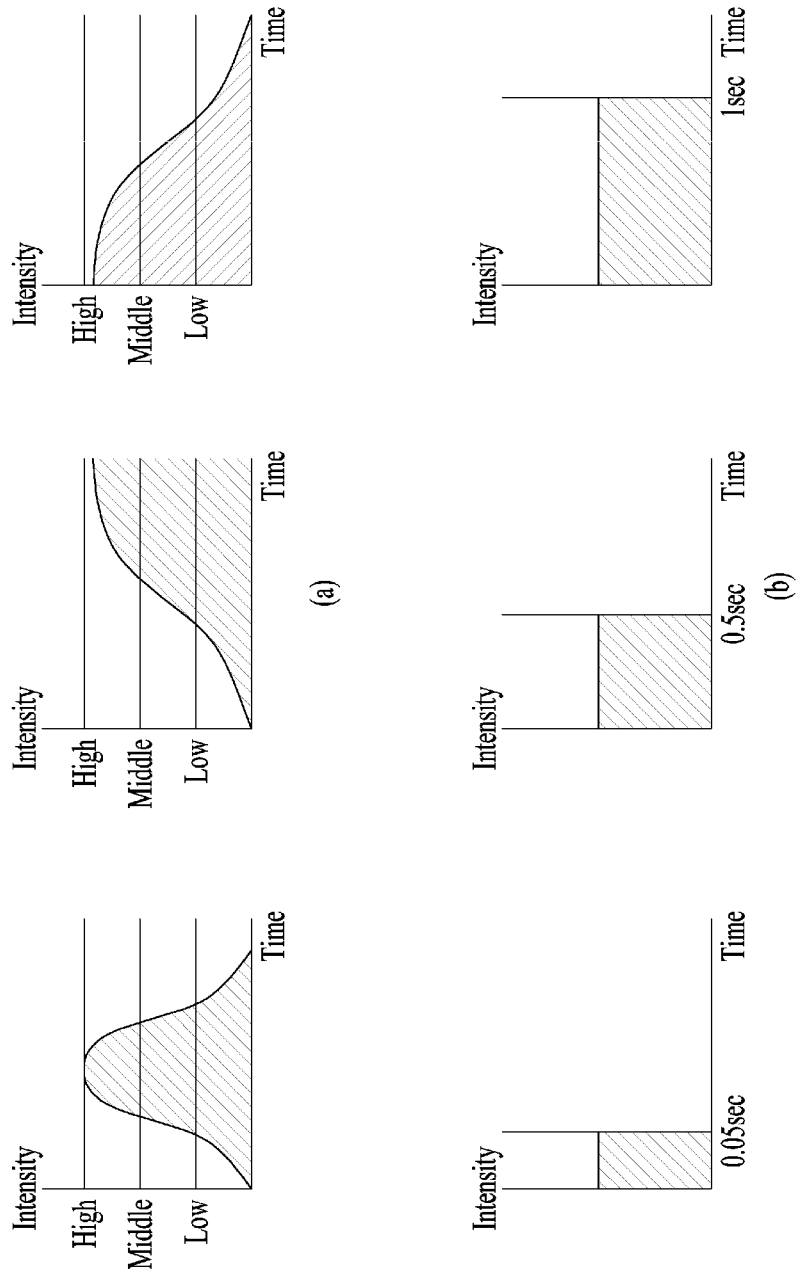
FIG. 4 illustrates some embodiments of vibration patterns of the portable audio equipment associated with the present invention.
Figure 5:
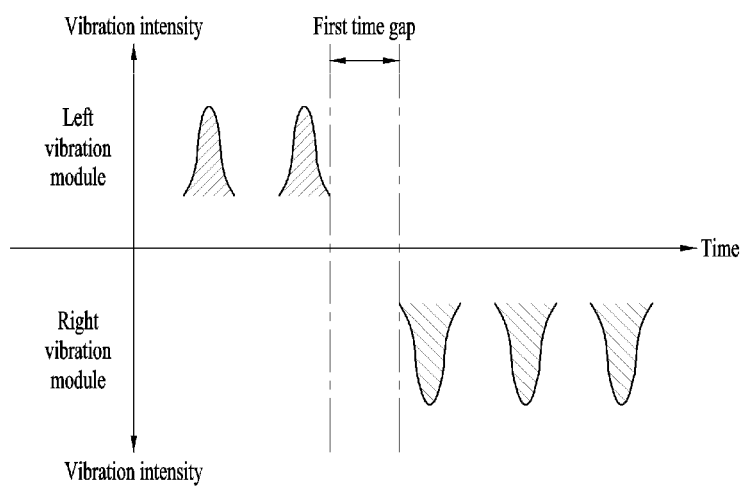
FIG. 5 illustrates some embodiments of vibration patterns of the portable audio equipment associated with the present invention.
Figure 6:
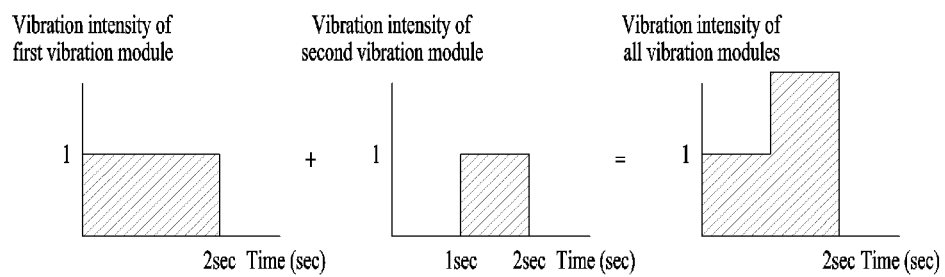
FIG. 6 illustrates some embodiments of vibration patterns of the portable audio equipment associated with the present invention.

FIGS. 4, 5, and 6 illustrate some embodiments of vibration patterns of the portable audio equipment 100 associated with the present invention.

Next, a description will be given of vibration patterns that may be generated through vibration modules.

The controller may apply a vibration pattern to the vibration unit such that a single vibration module or each of the plurality of vibration modules vibrates independently or in conjunction with each other according to a recognized or generated control signal.

The vibration pattern means that vibration recognizable by the user is transmitted to the user as the vibration modules differently determine whether to generate vibration specifically, vary the intensity of vibration over time. The vibration patterns of the respective vibration modules are combined with each other by a plurality of vibration modules, so that the vibration patterns of the whole vibration modules may transmit a wider variety of signals.

The vibration pattern may vary depending on the magnitude or status of vibration of a single vibration module or each of the plurality of vibration modules.

FIG. 4 illustrates an embodiment in which a vibration pattern varies depending on the magnitude, duration or status of vibration of one vibration module over time.

FIG. 4(a) shows continuous change in vibration intensity, and FIG. 4(b) shows a variation in vibration pattern through discontinuous change in vibration intensity.

As in the three cases of FIG. 4(a), the vibration intensity of the vibration module may gradually increase or decrease (hereinafter, this change is defined as a sinusoidal wave). As in the three cases of FIG. 4(b), the vibration intensity may suddenly increase or decrease with time (hereinafter, this change is defined as a square wave).

The vibration intensity of the vibration module may be adjusted through the number of rotations of the vibration motor provided in the vibration module.

In the case of FIG. 4 (b), a notification may be provided to the user more reliably than in the case of FIG. 4 (a), and may be used when an urgent event occurs.

In FIG. 4 (b), vibration patterns are generated with different vibration durations. Here, the vibration durations may be divided into a limited number of vibration patterns with appropriate number and time such that the user can distinguish between the vibration patterns.

The appropriate number of vibration patterns may be three: a short vibration of about 0.05 second, a middle vibration of about 0.5 second, and a long vibration of about one second.

FIG. 5 illustrates an embodiment of vibration patterns of a vibration unit associated with the present invention.

When a vibration module vibrates at constant intervals, the number of repetitive periods may also be recognized as a distinct vibration pattern.

The user may sense the number of vibrations based on repetition of the vibration state and the non-vibration state (idle state) and recognize the number of vibrations as one pattern.

A signal may be transmitted by applying distinct vibration patterns to a plurality of vibration modules. When the plurality of vibration modules includes a first vibration module and a second vibration module, the first vibration module may generate a first vibration pattern, and the second vibration module may generate a second vibration pattern.

As a specific example, when the first vibration module is a left vibration module and the second vibration module is a right vibration module, the left vibration module may transmit a first vibration pattern which is a continuous vibration signal having a period repeated twice, and the right vibration module may transmit a second vibration pattern which is a continuous vibration signal having a period repeated three times.

Here, the first vibration pattern and the second vibration pattern may occur with a first time gap therebetween such that the user is not confused between the patterns.

In order to more clearly distinguish between the patterns, each of the vibration modules may generate a vibration pattern with a different period, or generate vibration in a different form. That is, continuous vibration may be transmitted to one side and discontinuous vibration may be transmitted to the other side.

FIG. 6 illustrates some embodiments of a vibration pattern in which the overall vibration intensity changes when vibrations of a plurality of vibration modules are superimposed on each other.

Since it is assumed in the present invention that a plurality of vibration modules is provided, the vibration patterns of the plurality of vibration modules may overlap each other to change the overall vibration intensity.

That is, although the vibration modules are spaced apart, the overall vibration intensity felt by the user may be similar to the sum of the vibration intensities of the respective vibration modules.

For example, when the first vibration module vibrates at an intensity of 1.0 for an interval between 0 second and 2 seconds and the second vibration module vibrates at an intensity of 1.0 for an interval between 1 second and 2 seconds, the overall vibration intensity felt by the user may be 1.0 for the interval between 0 second and 1 second, and 2.0 for the interval between 1 second and 2 seconds. Accordingly, the user may recognize that the vibration started at 0 second and the vibration intensity increased at the time point corresponding to 1 second and consider the recognized vibration as one pattern.

The vibration intensity of the vibration unit may be distinguishably varied according to the level of an event.

When a control signal recognized according to the event includes a plurality of level values, the controller may vary the number of vibration modules that are to vibrate according to the plurality of level values.

A control signal including a plurality of level values may indirectly convey the meaning of the degree or intensity of an event. For example, when the event is reception of an urgent call, it may be assigned a higher level value so as to be distinguished from an event of reception of a normal call. Here, the urgent call may be recognized when a call comes in succession from the same number, or may be determined based on whether the event is preset as an urgent call.

Alternatively, the period of the vibration pattern may be varied according to a plurality of level values. For example, as the level value is increased, the period of the vibration pattern may become shorter. As the level value is decreased, the period of the vibration pattern may become longer.

Additional embodiments are described below.

The vibration presence/absence information and vibration intensity information about each vibration module over time may be varied according to the types of events.

The above-described embodiment is related to the vibration intensity of the vibration unit. In addition, the vibration patterns may be differentiated from each other according to whether the plurality of vibration modules vibrate spaced apart from each other, namely, the locations where vibration occurs.

That is, a vibration pattern may be generated by combining vibration statuses of the respective vibration modules. For example, if the left vibration module vibrates and the right vibration module does not vibrate, the user may recognize that vibration occurs on the left and distinguish the vibration from the vibration occurring on the right side.

FIG. 7 illustrates some embodiments of sequential vibration patterns of a plurality of vibration modules.

The vibration patterns may be distinguished from each other by a vibration sequence of a plurality of vibration modules.

In FIG. 3(a), the left vibration module 111-1 may vibrate first and then the right vibration module 111-2 may vibrate. Conversely, the right vibration module 111-2 may vibrate first and then the left vibration module 111-1 may vibrate. Sequential vibrations of the plurality of vibration modules 211 may be directional.

When the vibration unit 210 includes three vibration modules 211 as shown in FIG. 3(b), the controller may sequentially vibrate a first vibration module 111-3, which is positioned at an left end, a second vibration module 111-4, and a third vibration module 111-5, which is positioned at a right end.

The vibrations may sequentially occur in a reverse order from the vibration module 111-3, which is the last vibration module at the right end, to the first vibration module 111-3 in the longitudinal direction.

The user may recognize vibrations in both directions and recognize the same as the distinct vibration patterns.

In sequential vibration of a plurality of vibration modules, each vibration module may vibrate and then enter a non-vibration state (hereinafter, defined as an idle state) as shown in FIG. 7(*a*). That is, when one vibration module starts to vibrate and then switches to the idle state, another vibration module may start to vibrate.

Alternatively, as shown in FIG. 7(*b*), once each vibration module sequentially starts to vibrate, the vibration modules may maintain the vibration state until a specific time is reached.

The vibration pattern of FIG. 7(*a*) may be a one-dimensional pattern having directionality. On the other hand, in the vibration pattern of FIG. 7 (*b*), the vibration intensity of each vibration module increases with time. Accordingly, the vibration pattern may be a two-dimensional pattern including not only directionality but also magnitude.

The user may recognize a signal for a certain direction by the sequential vibration pattern of the vibration modules as in the embodiments of FIGS. 7(*a*) and 7(*b*). This operation may be applied to various situations which will be described below.

The embodiments of FIGS. 7(*a*) and 7(*b*) may be applied to a case where only two vibration modules are provided, but they may be most effective applied when three or more vibration modules are provided. Since the vibration pattern exemplifies only one period, it is difficult to recognize the directionality with only two vibration modules when the period is repeated.

For a directional sequential vibration pattern, the housing having a neckband shape that is open on one side may be most preferable.

Vibration of the vibration module is not limited to the corresponding spot but tends to propagate. When one side is open and separated, the vibration does not spread to the open point. In this case, clear directionality as described above may be obtained.

As described above, the vibration patterns may include a combination of vibration statuses of the respective vibration modules, a vibration order of the vibration modules, a vibration time gap between the vibration modules, that is, a duration of an idle state between the end and start of vibration of the plurality of vibration modules. In addition, the vibration pattern may have an effect affect according to a vibration duration of a specific vibration module or a duration of idle vibration.

Accordingly, a distinct vibration pattern may be configured by selecting or combining various factors for vibration patterns.

While FIGS. 7 (*a*) and 7(*b*) illustrates that the vibration intensity of each vibration module continuously changes in the form of a sinusoidal wave, the invention may also be applied to a case where the vibration intensity changes discontinuously in the form of a square wave.

Figure 8:
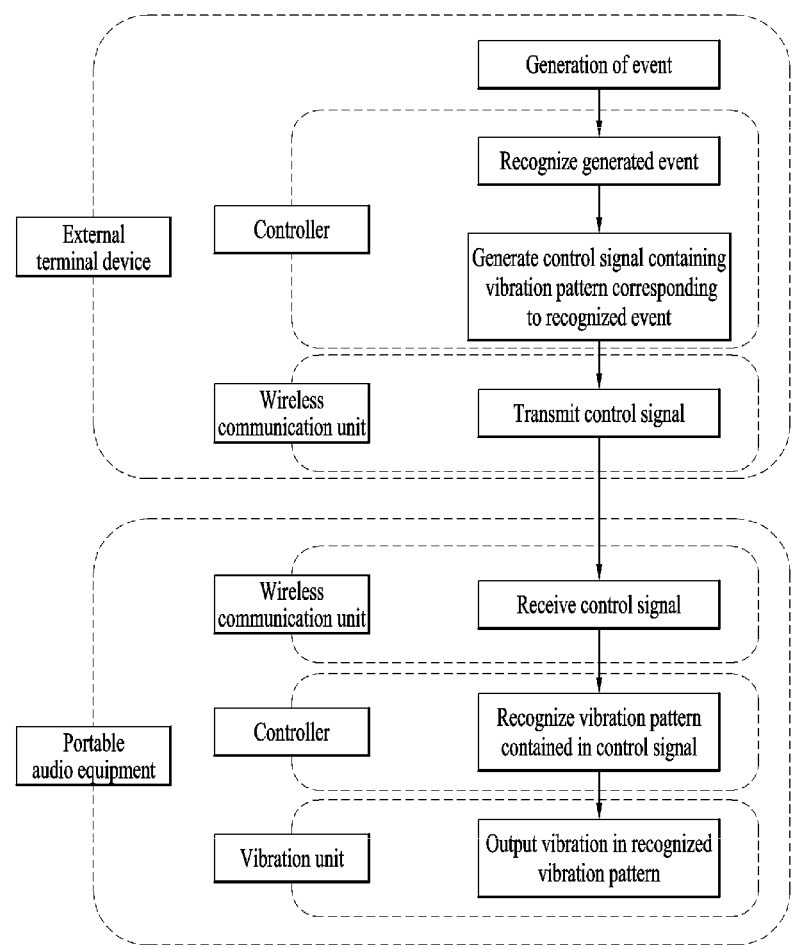
FIG. 8 illustrates flow of control signals relating to a vibration pattern of the portable audio equipment associated with the present invention.
Figure 9:
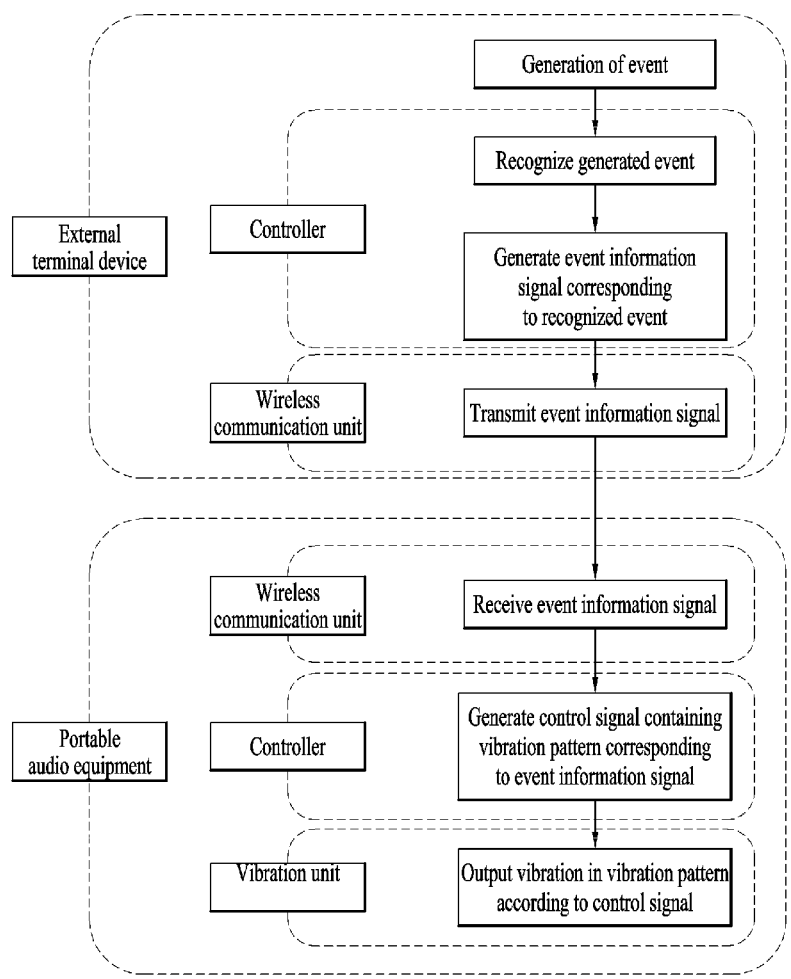
FIG. 9 illustrates flow of control signals regarding a vibration pattern of the portable audio equipment associated with the present invention.

FIGS. 8 and 9 illustrate flow of control signals regarding a vibration pattern of the portable audio equipment associated with the present invention.

The vibration unit of the portable audio equipment serves to inform the user of an event occurring in the portable audio equipment or an event occurring in an external terminal device connected to the portable audio equipment.

An event occurring in the portable audio equipment may be announced, or an event occurring in an external terminal device connected to the portable audio equipment may be announced by the portable audio equipment.

When the portable audio equipment announces an event occurring in the external terminal device, a subject to generate a control signal having the vibration pattern for the announcement should be identified.

The control signal for the vibration pattern may be generated by the controller of the external terminal device in which the event occurs, and then transmitted to the portable audio equipment (see FIG. 8). Based on the vibration pattern information in the control signal transmitted to the portable audio equipment, the controller of the portable audio equipment may cause the vibration unit to vibrate.

Alternatively, the information about the event may be transmitted to the portable audio equipment, and the controller of the portable audio equipment may control the vibration unit by generating a vibration pattern control signal corresponding to the received event information (see FIG. 9).

As shown in FIG. 8, when the external terminal device generates the control signal, the number and arrangement of vibration modules of the portable audio equipment receiving the signal may differ from case to case. Accordingly, the control signal needs to have information considering the number and arrangement. This signal may take the form as shown in FIG. 10.

FIG. 10 is a conceptual diagram of control signals of the portable audio equipment associated with the present invention.

Control signals for vibration patterns may be divided based on the number of vibration modules of the vibration unit. For example, the vibration pattern information corresponding to a case where the number of vibration modules is two, three, four, or the like may be stored based on each case.

The portable audio equipment may receive the control signal, compare the signal with the information about the number of vibration modules of the portable audio equipment, and perform a subsequent operation based on the vibration pattern information on the matching number of vibration modules.

The control signal may include vibration module identification information according to the number of vibration modules. The vibration module identification information may include an identifier, such as the first vibration module or the second vibration module, and location information corresponding to the vibration module.

The location information includes a relative positional relationship between the plurality of vibration modules or information about locations in the housing of the portable audio equipment. Accordingly, the vibration pattern for each vibration module may be matched with the vibration modules of the portable audio equipment based on the location information.

—Embodiment of Generating an Event to which a Vibration Pattern is Applied—

1. Generation of a Vibration Pattern for Distinguishing an Event of a Connected External Terminal Device Vibration patterns may be formed in correspondence with a plurality of different events of an external terminal device. For example, when a specific event from a person stored in an address book of the external terminal device occurs, the portable audio equipment may output a vibration pattern corresponding to the counterpart in the address book for the specific event.

Here, the specific event may be, for example, a call reception, an SMS reception, or the like.

The user may intuitively know the event and a person that has triggered the event based on the vibration pattern.

For example, as shown in FIG. 5, the user may recognize the type of the triggered specific event through the vibration pattern of the left vibration module according to a predetermined signal code, and recognize the counterpart for the specific event through the vibration pattern of the right vibration module.

As a specific example, as a predetermined signal code, a continuous vibration signal whose period is repeated twice in the left vibration module may indicate that a call reception event has been triggered, and a continuous vibration signal whose period is repeated three times in the right vibration module may indicate that a person stored in telephone directory #3 is the counterpart of the triggered event.

That is, the first vibration pattern may correspond to the type of an event triggered in the external terminal device, and the second vibration pattern may correspond to information about the counterpart of the event triggered in the external terminal device.

Figure 11:
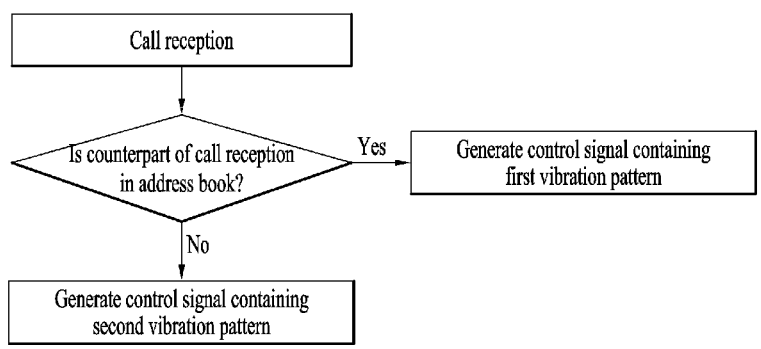
FIG. 11 illustrates an embodiment of output of vibration patterns of the portable audio equipment associated with the present invention.

FIG. 11 illustrates an embodiment of output of vibration patterns of the portable audio equipment associated with the present invention.

Alternatively, a vibration pattern may be output by determining whether an event triggered in the external terminal device is generated from a counterpart in the address book. When a call reception event occurs, the external terminal device or the portable audio equipment may determine whether the counterpart is a person in the address book. If the counterpart is in the address book, the external terminal device or the portable audio equipment may generate a control signal including the first vibration pattern. For example, the first vibration pattern may be a vibration pattern that alternately vibrates the first vibration module and the second vibration module.

If the counterpart is not in the address book, the controller of the external terminal device or the portable audio equipment may generate a control signal including the second vibration pattern.

That is, if the event generated in the external terminal device satisfies preset conditions, the first vibration pattern may be output. Otherwise, the second vibration pattern may be output.

The second vibration pattern may be a vibration pattern in which only one of the first vibration module or the second vibration module vibrates.

2. Generation of a Pattern Signal for Distinguishing a Plurality of Devices

Suppose that there is a plurality of external terminal devices connected to the portable audio equipment of the present invention. The user may indirectly recognize a connected external terminal device among the plurality of external terminal devices, or an external terminal device from which a specific signal is received.

2-1. Connection of or Switch Between External Terminal Devices

For example, suppose that a plurality of external terminal devices can establish wireless connection with the portable audio equipment. When it is assumed that connectable external terminal devices are sequentially wirelessly connected whenever a user presses a wireless connection button, a specific external terminal device will be wirelessly connected according to pressing of the wireless connection button. At this time, it is difficult for the user to distinguish whether an external terminal device is connected or not, and which external terminal device is connected, unless the portable audio equipment has an output unit such as a display portion or outputs a corresponding voice.

The plurality of distinct vibration patterns may be matched with each of a plurality of external terminal devices to output a vibration pattern corresponding to a wirelessly connected external terminal device.

The same configuration may be applied to a case where a target to receive the signal is switched among a plurality of wirelessly connected external terminal devices or the operation is activated with one device.

Here, activation means a state in which data can be transmitted/received between an external terminal device and the portable audio equipment immediately without any operation for switching between the devices.

Suppose that a plurality of external terminal devices is are allowed to transmit/receive signals to/from the portable audio equipment in an overlapping manner. When a plurality of external terminal devices are reproducing each sound source, the user may recognize external terminal devices outputting sound sources through the portable audio equipment by pressing the wireless connection button.

This operation is not limited to sound source reproduction, and may be applied to any event-related signal among a plurality of external terminal devices providing signals at the same time.

2-2. Locating External Terminal Devices

Figure 12:
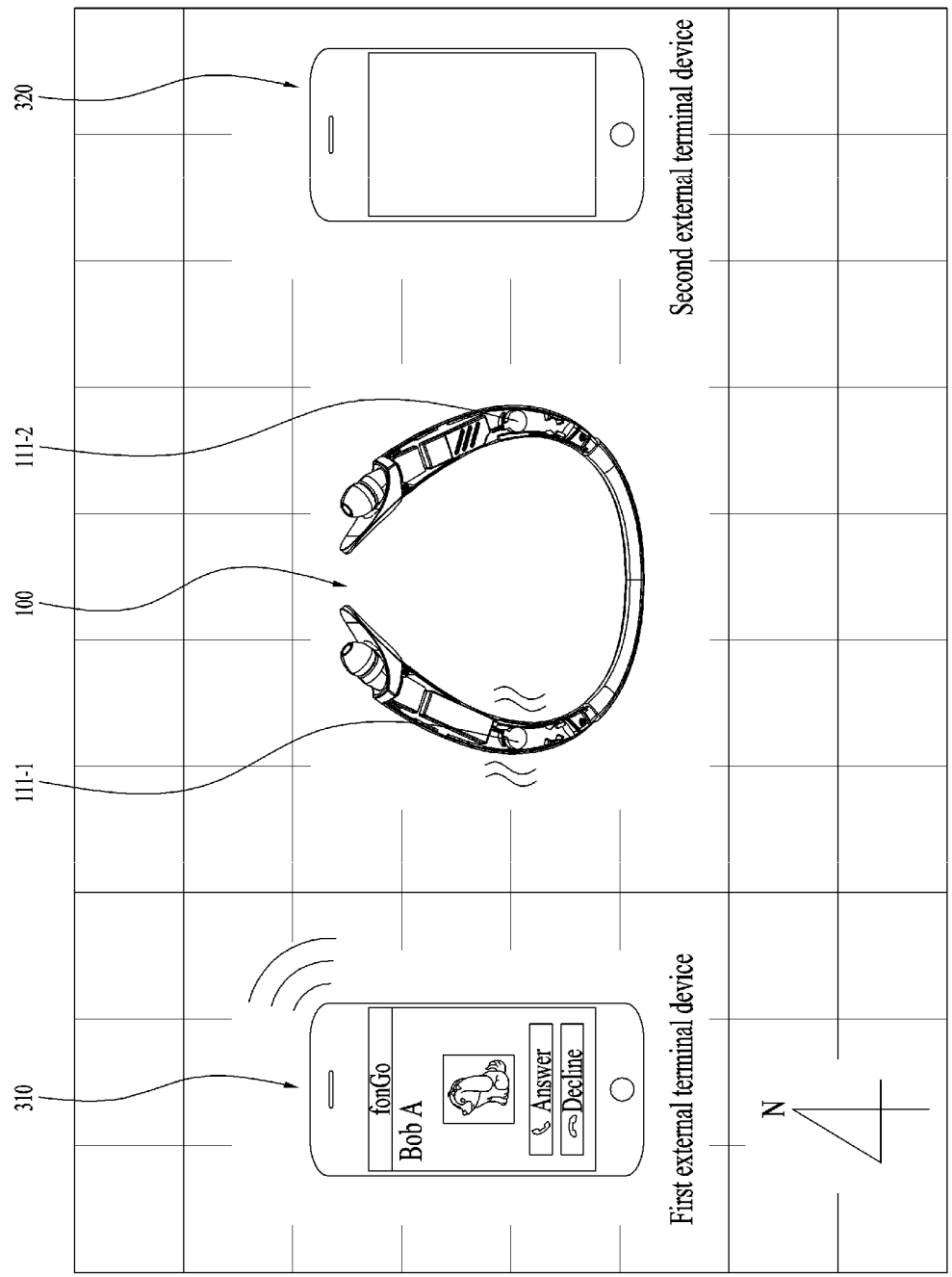
FIG. 12 illustrates an embodiment of output of vibration patterns of the portable audio equipment associated with the present invention.

FIG. 12 illustrates an embodiment of output of vibration patterns of the portable audio equipment 100 associated with the present invention.

The portable audio equipment 100 may announce an external terminal device from which a signal is received among a plurality of external terminal devices 310 and 320 wirelessly connected thereto or may announce information about the direction in which a single external terminal device is positioned in a case where the single external terminal device is wireless connected thereto.

For example, suppose that the portable audio equipment 100 is wirelessly connected to a first external terminal device 310 and a second external terminal device 320, and that the first external terminal device 310 is positioned on the right side of the portable audio equipment 100 and the second external terminal device 320 is positioned on the left side of the portable audio equipment 100.

When a specific event occurs in the first external terminal device 310 positioned on the left side, the controller of the first external terminal device 310 or the portable audio equipment 100 may generate a control signal including a vibration pattern such that a vibration module corresponding to the direction in which the first external terminal device 310 is located vibrates.

As the vibration pattern is generated, the user only needs to check the external terminal device in the direction corresponding to the vibration module which is vibrating, rather than checking all external terminal devices wirelessly connected to the portable audio equipment.

To implement this function, the portable audio equipment 100 may include a motion sensor capable of recognizing an orientation.

The motion sensor may measure the acceleration, tilt or orientation of the portable audio equipment 100. The motion sensor may include at least one of an acceleration sensor, a gyro sensor, or a terrestrial magnetism sensor.

The location information module may identify the location of the portable audio equipment 100 and change in location over time.

The controller of the portable audio equipment 100 receives location information and event information about at least one of a plurality of external terminal devices via the wireless communication unit. The portable audio equipment calculates the direction in which an external terminal device from which the event information is received is located, based on the received location information, the location of the portable audio equipment recognized through the location information module, and the orientation recognized through the motion sensor. Here, the direction in which the external terminal device from which the event information is received is located is based on the portable audio equipment 100. The controller may cause a vibration module corresponding to the calculated direction to output a vibration pattern. The vibration pattern may be based on the content of the generated event.

Events that may occur in an external terminal device may include call reception and SMS reception.

3. Sound Enhancement

The portable audio equipment may reproduce a sound source transmitted from an external terminal device connected thereto. The portable audio equipment may output a different vibration pattern of the vibration unit based on the characteristics of the reproduced sound source.

Particularly, the frequency of the reproduced sound source may be analyzed and divided into a plurality of level values, and a corresponding vibration pattern may be output. The criterion for dividing the frequency into the plurality of level values may be a band of the sound source frequency and the output magnitude of the sound source frequency.

For example, a band having a high tempo may be set to a relatively high level and a band having a low tempo may be set to a relatively low level, based on a frequency band of the reproduced sound source. In particular, a short-period vibration pattern may be output for a high level value and a long-period vibration pattern may be output for a low level value, such that sound beat is transmitted to the user in the form of vibration.

Alternatively, when four vibration modules 211 are provided as shown in FIG. 3(c), when a portion of the sound source corresponding to a low frequency band is output, two vibration modules 211 provided at the rear part of the housing are caused to generate vibration. When a portion of the sound source corresponding to a high frequency band is output, two vibration modules provided at the front part of the housing are caused to generate vibration.

This is based on the premise that the rear vibration modules transmit a larger vibration to the user. Thus, a larger vibration may be generated for a lower frequency to perform a function similar to a woofer.

In addition, the output magnitude of a sound source may be divided into several levels such that a larger number of vibration modules can vibrate at a higher output level.

Alternatively, a vibration pattern in which a plurality of vibration modules sequentially vibrates may be generated. In this case, if the frequency is abruptly changed according to the tendency of frequency change, the time period of the vibration pattern may be shortened. Otherwise, vibration may be generated by lengthening the time period of the vibration pattern.

For example, when the tempo of the sound source is high, a fast sequential vibration pattern may be output. When the tempo of the sound source is low, a slow sequential vibration pattern may be output. Thereby, an additional sound field effect may be transmitted to the user.

4. Direction Indication

A travel direction may be indicated to the wearer of the portable audio equipment through a vibration pattern. When the wearer is moving to a destination on foot or a ride, the portable audio equipment may provide guidance to the wearer on the route.

As an example, when the wearer needs to turn, the wearer may be notified of the turn in advance through a vibration pattern. If the wearer who is walking should move to the left, the vibration module located on the left side based on the wearing condition of the portable audio equipment may be caused to vibrate.

In this case, the distance from the current location to a position where the wearer needs to turn, the current moving speed, and the angle by which the turn should be made may affect the vibration pattern.

Figure 13:
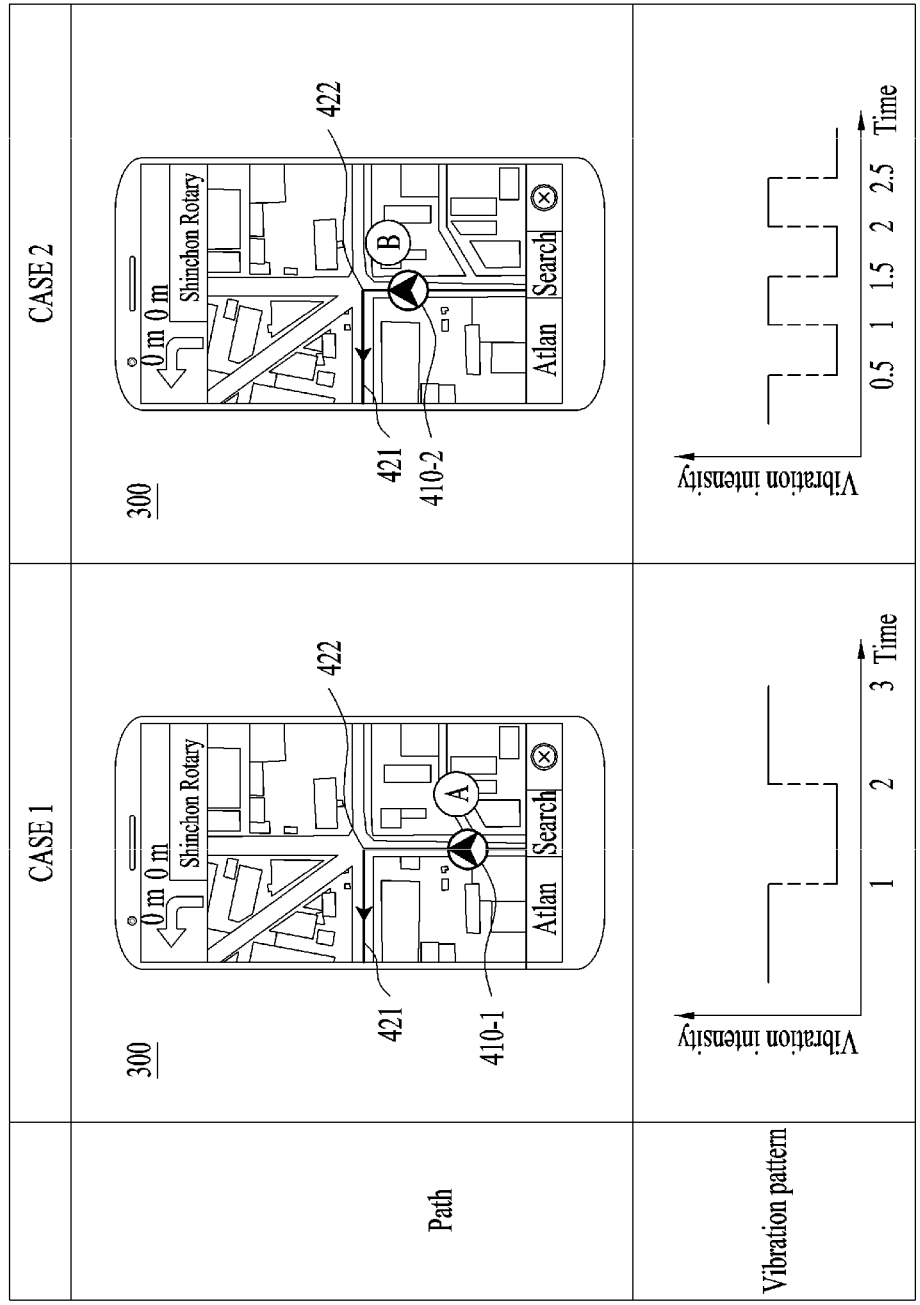
FIG. 13 illustrates screen views of a navigation application of an external terminal device related to the present invention, and embodiments of vibration patterns of the portable audio equipment according to the screen views.

FIG. 13 illustrates screen views of a navigation application of an external terminal device 300 related to the present invention, and embodiments of vibration patterns of the portable audio equipment 100 according to the screen views.

CASE 1 and CASE 2 relate to embodiments of vibration patterns according to different current locations 410-1 and 410-2 on the same travel path 421.

The wearer may recognize a time within which a turn should be made based on a repetition rate, or period, of the vibration pattern of a vibration module.

The approximate time in which the wearer will arrive at the position 422 where the turn should be made may be calculated in consideration of the distance from the current location 410 to the position 422 to where the turn should be made and the current moving speed. If the calculated arrival time is less than a predetermined reference value, a higher level value may be assigned to transmit a vibration pattern alarm of a higher intensity or a shorter vibration period. If the calculated arrival time is greater than the predetermined reference value, a lower level value may be assigned to transmit a vibration pattern alarm of a lower intensity or a longer vibration period.

For example, when the calculated arrival time from the current location 410 to the position 422 where a turn should be made is greater than or equal to a preset value, a vibration pattern in which one vibration module on the front left side is caused to vibrate for one second and generate idle vibration for one second may be periodically transmitted. If the calculated arrival time is less than the preset value, one vibration module on the front left side may be caused to vibrate for 0.5 seconds and generate idle vibration for 0.5 seconds.

Figure 14:
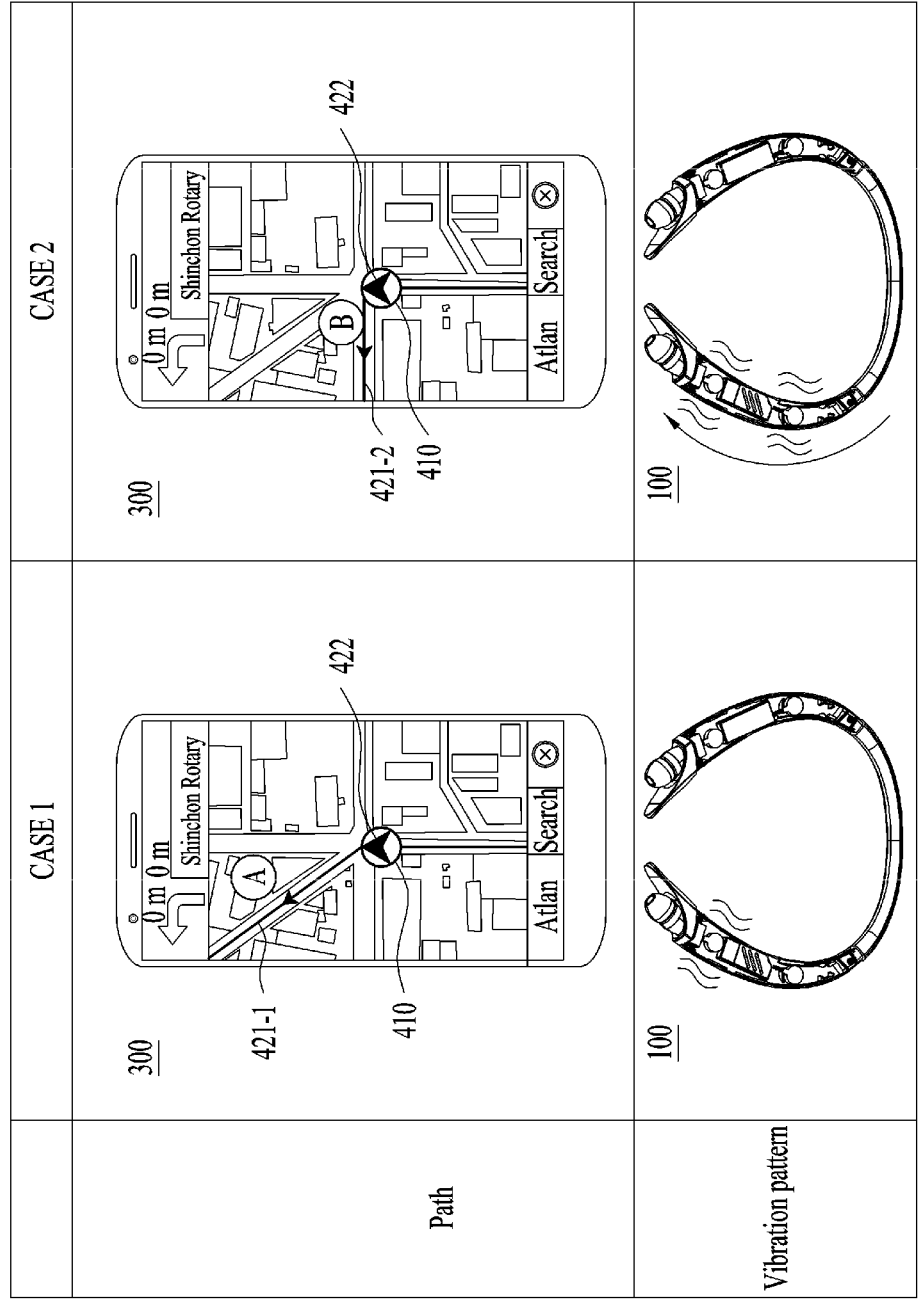
FIG. 14 illustrates screen views of a navigation application of an external terminal device related to the present invention, and embodiments of vibration patterns of the portable audio equipment according to the screen views.

FIG. 14 illustrates screen views of a navigation application of the external terminal device 300 related to the present invention, and embodiments of vibration patterns of the portable audio equipment 100 according to the screen views.

CASE 1 and CASE 2 relate to embodiments of vibration patterns according to different travel paths 421-1 and 421-2.

The intensity of the vibration pattern may be varied based on the degree to which the user needs to turn, that is, a required turn angle.

For example, if an angle by which a turn should be made is large, a high level value may be assigned to output a vibration pattern of a high vibration intensity. If an angle by which a turn should be made is small, a lower level value may be assigned to output a vibration pattern of a low vibration intensity.

That is, the controller may output a vibration pattern of a first intensity when a required turn angle on the navigation application is a first angle, and output a vibration pattern of a second intensity higher than the first intensity when the required turn angle is larger than the first angle.

In particular, the vibration intensity may correspond to the number of vibration modules to vibrate. Further, a plurality of vibration modules may sequentially vibrate to indicate a specific direction.

For example, when a small-angle left turn is required, one left vibration module may vibrate. When a large-angle left turn is required, a pattern in which two left vibration modules sequentially vibrate may be formed.

Figure 15:
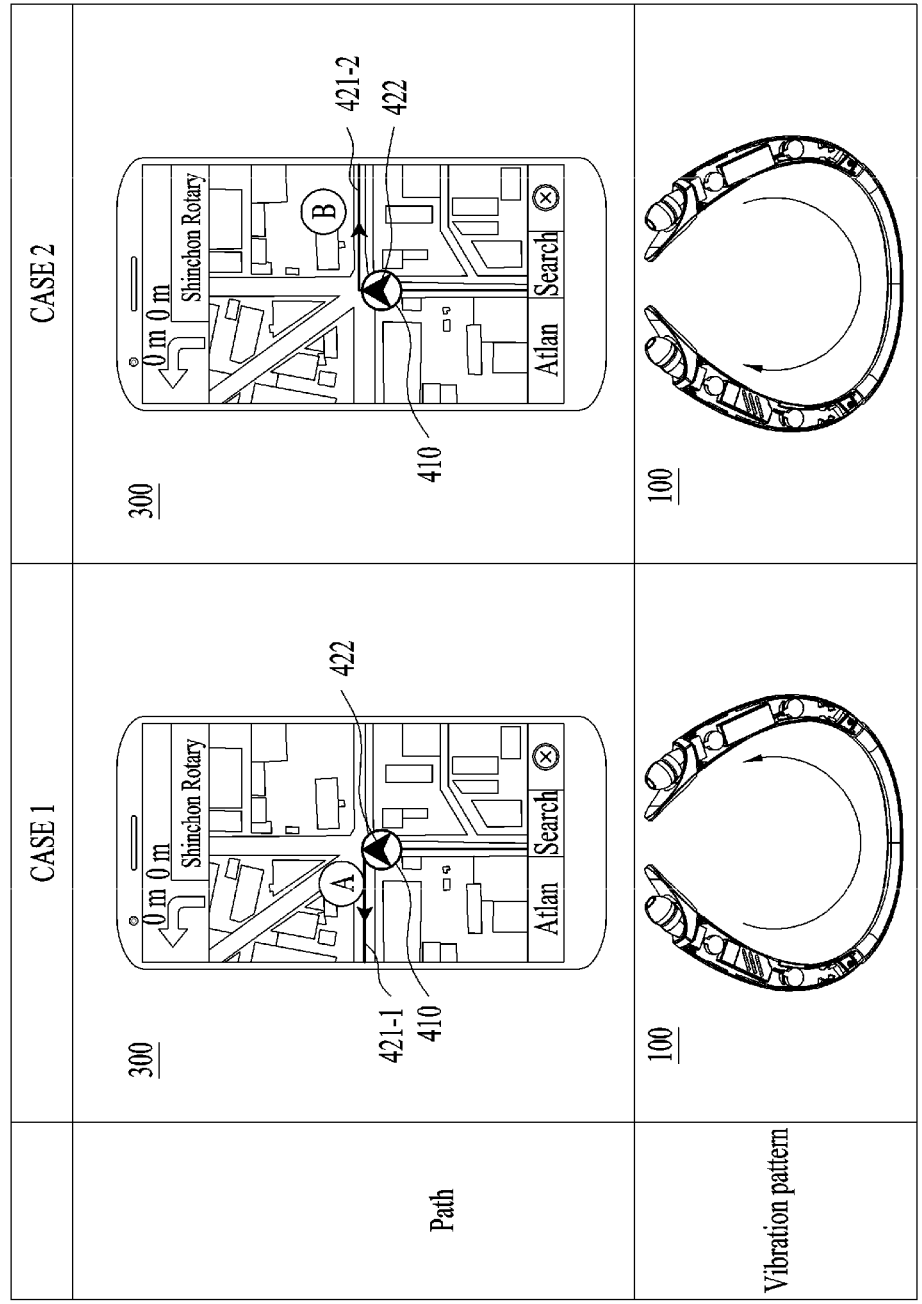
FIG. 15 illustrates screen views of a navigation application of an external terminal device related to the present invention, and embodiments of vibration patterns of the portable audio equipment according to the screen views.

FIG. 15 illustrates screen views of a navigation application of the external terminal device 300 related to the present invention, and embodiments of vibration patterns of the portable audio equipment 100 according to the screen views.

A control signal may include direction information, and the controller may determine a direction of sequential vibration according to the direction information in the control signal.

CASE 1 and CASE 2 relate to embodiments of vibration patterns according to different travel paths 421-1 and 421-2.

A vibration pattern in which a plurality of vibration modules sequentially vibrates may be provided according to a guided turn direction. Particularly, when the user is moving on a ride, a vibration pattern of the same direction as the guided turn direction of the steering apparatus may be designated to provide an intuitive notification to the user.

For example, when a left turn should be made as in CASE 1, the steering wheel of a vehicle should be turned counterclockwise. Accordingly, the vibration pattern generated in the portable audio equipment at this time may be a counterclockwise sequential vibration.

On the other hand, when a turn should be made to the right as in CASE 2, a clockwise sequential vibration pattern may be generated.

That is, an event of a left turn may generate a control signal including direction information for a counterclockwise direction, and an event of a right turn may generate a control signal including direction information for a clockwise direction. Here, the direction information may coincide with the direction of a sequential vibration pattern of a plurality of vibration modules.

5. Adjustment of Vibration Pattern Based on Sensing of Moving Speed or Noise (1) Adjustment of Vibration Pattern Considering Means of Transportation The portable audio equipment may have a shock sensor. The shock sensor may detect vibrations and movements occurring in the portable audio equipment. An example of the shock sensor may be an acceleration sensor.

Through the above-described location information module and the shock sensor, it may be checked whether the wearer of the portable audio equipment is walking, running, riding a bicycle, or moving on a vehicle.

An approximate location change, that is, a speed or a pattern of speed change may be sensed through the GPS or wireless network, and it may be determine whether the user is walking, running, or moving on a ride through the shock sensor.

The location information module or the shock sensor may be provided in an external terminal device wirelessly connected to the portable audio equipment to transmit the information to the portable audio equipment, or may be provided in the portable audio equipment such that the module measure the information and transmit the information to the controller.

The controller may determine the transportation means. Thus, when the user moves on a ride, the controller may transmit vibration by changing the vibration intensity or the vibration period.

When the wearer of the portable audio equipment is moving on a ride, the wearer concentrates on driving, and thus it is not easy for the wearer to know whether an event is triggered in the external terminal device. Accordingly, in this case, a vibration pattern may be generated with a higher intensity or a vibration pattern period may be shortened to provide a stronger stimulus to the wearer.

Furthermore, the intensity or period of the vibration pattern may be adjusted according to the moving speed. Moving speeds may be divided into a plurality of sections to output a vibration pattern with a higher intensity or a shorter period for a higher moving speed. That is, a higher level of the control signal may be set for a higher moving speed.

The adjustment of the vibration pattern corresponding to the moving speed may be applied when an event occurs in an external terminal device or the portable audio equipment, or an algorithm that generates a vibration pattern corresponding to the moving speed may be implemented regardless of occurrence of an even. When a vibration pattern corresponding to the moving speed is generated, the wearer may indirectly recognize the moving speed, thereby enjoying the speed or determining the possibility of danger.

Alternatively, when the user is walking or running, the intensity of the vibration pattern may be increased or the period of the vibration pattern may be shortened. When the user is walking or running, the portable audio equipment is not stably attached to the wearer's body due to movement of the body, and thus it is often difficult to feel the vibration.

Accordingly, in consideration of this issue, a vibration pattern with a higher vibration intensity or a shorter period may be transmitted to allow the wearer to easily recognize the pattern.

(2) Adjustment of a Vibration Pattern in Consideration of the State of an External Terminal Device During walking or running, the wearer may hold the external terminal device in hand or may not hold the external terminal device. In the former case, an event occurring in the external terminal device may be easily checked. However, in the latter case, it is not easy to check the event. Accordingly, the two cases may be distinguishably recognized to adjust a vibration pattern generated in portable audio equipment.

When the external terminal device is not held by hand, it is highly probable that the external terminal device is in the pocket or a bag. Accordingly, when the light intensity sensed by an illumination sensor provided in the external terminal device is less than a predetermined intensity, it may be determined that the user does not hold the external terminal device in hand, and thus a vibration intensity greater than or equal to a predetermined value may be output or a vibration period shorter than or equal to a predetermined value may be output.

In order to determine that the user is walking, the controller may check the degree of location change using the location information module provided in the portable audio equipment, and the algorithm described above may be applied only when the checked degree of location change is less than a predetermined value.

6. Drowsiness Prevention Alarm

A vibration pattern alarm for preventing drowsiness may be provided when the user is moving on a ride, studying, or working.

The alarm may be provided to alert the user when movement of the portable audio equipment stays without making movement for a predetermined time or longer or when a slope change occurs in a predetermined pattern. The motion of the portable audio equipment may be determined through a motion sensor.

The case where the motion of the portable audio equipment does not occur may be considered in combination with other information in order to distinguish the case from a case where the user is actually sleeping or a case where the equipment is simply place or mounted at a specific location.

For example, in order to distinguish the motion-related case from the case of simple mount or placement of the portable audio equipment, the portable audio equipment may be set to determine if no motion occurs only when the music is being played on the portable audio equipment.

Alternatively, the motion-related case may be distinguished based on the slope because the slope between a case where the equipment is placed on a floor and a case where the equipment is worn around the wearer's neck. When the equipment is worn around the wearer's neck, the front portion of the portable audio equipment may be positioned below the rear portion of the portable audio equipment compared to a case where the portable audio equipment is placed on the floor.

7. Alarm Setting

Generating a vibration pattern for all events occurring in the external terminal device may cause confusion to the user.

Accordingly, the vibration pattern may be generated only for an event set by the user. The set events may be distinguished by each application executed in the external terminal device.

Such setting may be performed through a portable audio equipment control application that links the external terminal device with the portable audio equipment.

The portable audio equipment control application may be installed on an external terminal device.

Assuming that there is a particular application that generates an event for which an alarm is needed, the particular application and the event for which an alarm is needed may be specified within the portable audio equipment control application.

For example, a desired event may be a received text message including a specific text or a number, a text upload notification of a social network service (SNS), or information included in a call reception event. In particular, a text message that is a desired event may contain important information such as emergency disaster text information.

Accordingly, such a vibration pattern alarm may replace a push notification generated in the external terminal device or may occur together with the push notification, thereby making sure that the alarm is provided to the user.

8. Game

The vibration pattern output of the portable audio equipment may be generated in response to a game being executed. The vibration pattern may vary depending on the genre of the game and the kind of a game event that has occurred. Several concrete examples will be described later.

The genres of games are broadly divided into typical games such as role playing game (RPG), action, shooting, and first person shooter (FPS). There are also adventure games, strategy and simulation games, board games, and sports games.

There are game events that are characterized by the genres of games, and a different vibration pattern may be output according to the game event to inform the gamer of various situations or to add fun.

The controller of the external terminal device that executes a game may distinguish the genre of the game, detect a game event type corresponding thereto, and finally output a corresponding vibration pattern.

(1) Typical Games

For simplicity, the RPG, action, shooting, and FPS games are classified as typical games. However, other kinds of games may also be included in the typical games as needed. As representative examples, "Zenonia" is an RPG game, "King of Fighters" is a action game, "Dragon Flight" is a shooting game, and "Overwatch" is a FPS game.

In the typical games, an event in which an enemy is hit or shot gives a great sense of accomplishment to the garner, and the sense of accomplishment is boosted when it is transmitted through various senses such as sound or vibration as well as visual elements.

Events that may occur in a typical game include enemy strikes, last strikes, attacks by the enemy, appearance of enemy bosses, use of skills, use of lethal techniques, hitting obstacles such as walls, death of characters, acquisition of items, use of items, and combination of items.

Vibration patterns corresponding to such events may be generated. Particularly, when a character is shot by an enemy or hits an obstacle such as a wall, the enemy position or the direction in which the obstacle is located may be indirectly indicated through a vibration pattern.

For example, when a shot occurs on the right side of a character, a vibration pattern may be output such that a vibration module provided on the right side vibrates among a plurality of vibration modules. The wearer may intuitively recognize the location of the enemy or the location of the obstacle through the location of the vibration and take an action.

In an FPS game, an enemy's approach can be indirectly announced to the user through the sound of the enemy's footstep while the enemy is not visible. In this case, the sound is usually divided into left and right channels. Even when the sound is transmitted through multiple channels such as the 7.1 channel, it is often difficult to sense a specific direction due to the limitation of the body.

The vibration of the vibration modules may more clearly indicate the situation. The controller of the external terminal device may recognize the direction of the enemy's approach and may generate a control signal for vibrating a vibration module corresponding to the direction.

Alternatively, in attacking the enemy, when the enemy is hit using a lethal technique, a distinct vibration for the attack may be generated. In the above two cases, a sense of hitting may be provided by adjusting the intensity or period of the vibration pattern.

(2) Adventure Game

An adventure game may be defined as a game in which the main character resolves an event or problem according to a preset plot, and advances toward a final goal. For example, "Room escape game" or "Gray city" is an example of the adventure games.

Events that may occur in an adventure game may include an event of determining an investigation direction, an event of determining a movement direction to move, a story progress event, an event of acquiring, using or combining items, and death of a character.

Vibration patterns corresponding to such events may be set.

In particular, when there is an event of determining the investigation direction, an event of determining a movement direction to move, or an event indicating the direction of occurrence in the story progress, a vibration pattern for the corresponding direction may be output.

(3) Strategy and Simulation Game

A strategy and simulation game refers to a game in which the purpose that is sought is to be obtained by figuring out the operation of each component and the flow of the game. Representative examples are "Air Tycoon," "Boom Beach" and "StarCraft."

In particular, a real-time strategy game requires a quick judgment and response of a gamer. Accordingly, it is necessary to effectively inform the gamer of occurrence of an event in the game.

Figure 16:
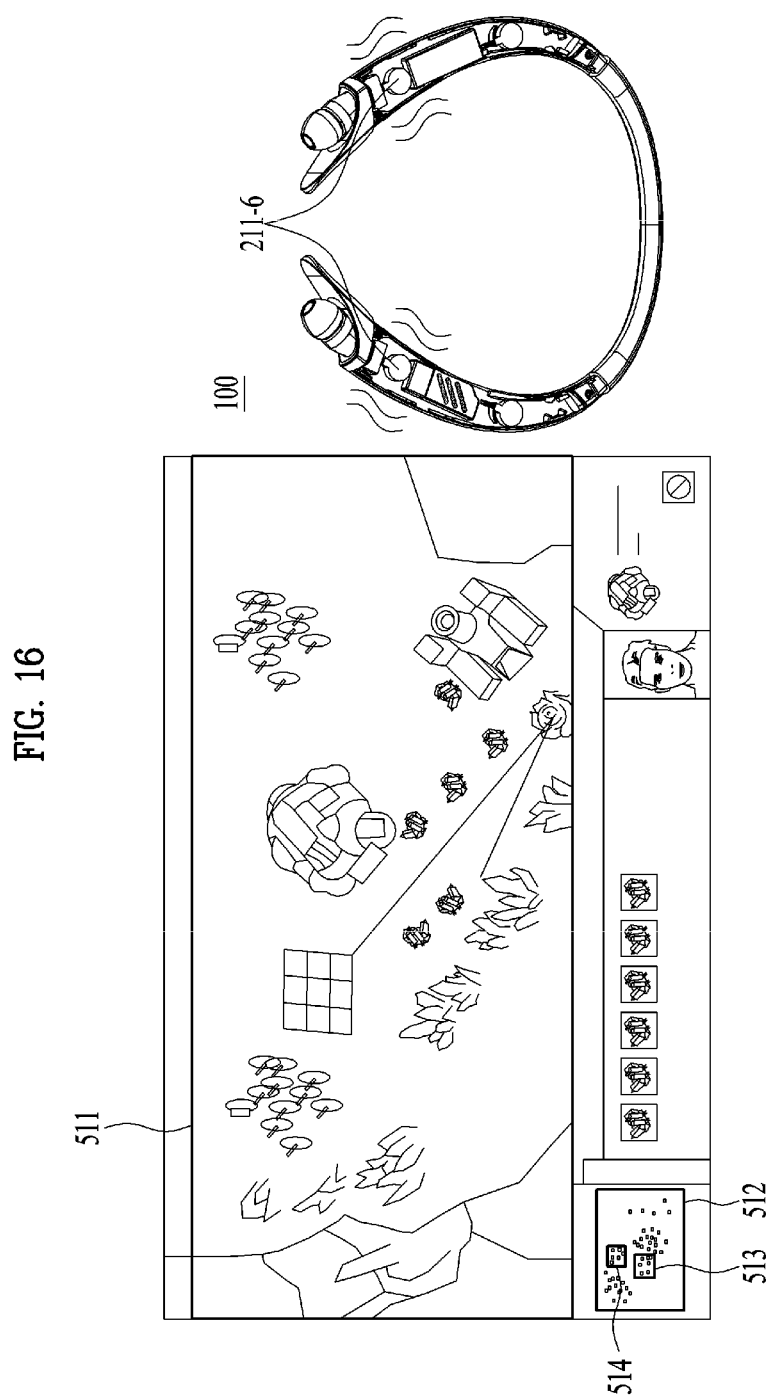
FIG. 16 illustrates a gaming view of an external terminal device related to the present invention and a vibration state of the portable audio equipment according to the gaming view.

FIG. 16 illustrates a gaming view of the external terminal device 300 related to the present invention and a vibration state of the portable audio equipment 100 according to the gaming view.

For example, when the gaming view includes a main screen view 511 showing a focused area 513 and a sub-screen view 512 showing a mini map, the gamer concentrates only on the focused area 513 in the main screen view 511. Accordingly, when an event occurs in the sub-screen view 512, i.e., the unfocused area 514, the event may be announced by outputting a vibration pattern.

For example, suppose that an enemy attack has occurred in the unfocused area 514, and this area is located above the focused area 514. In this case, a vibration pattern may be generated in the vibration module 211-6 of the portable audio equipment that corresponds to the front.

(4) Board Games

Examples of the board games include "Everybody's Marble" or "Matgo". Events that may occur in a board game may include score acquisition, income generation, an action of playing a card or rolling a die, triggering of a specific situation, a game end event, and acquisition, use, or combination of items.

Particularly, when a vibration pattern is generated in response to an active motion of a user of playing a card or rolling a die, the situation may be more dynamically transmitted to the user. In particular, a vibration pattern as long as the actual situation may be generated. For example, when the gamer plays a card, a short vibration may be output because a corresponding sound effect is generally generated for a short time. When a die is rolled, a sound effect is generated for a relatively long time, and thus a medium-length vibration or a long vibration may be output.

Further, a vibration pattern may be output with a higher intensity when a higher score is obtained.

(5) Sports Games

Examples of sports games include "NBA" and "Professional Baseball." Events that may occur in a sports game regarding obtaining scores in ball games may include a ball shooting event and a ball hitting event.

For example, when a ball shot in a basketball game bounces off the ring, vibration may be generated.

FIG. 17 illustrates a gaming view of an external terminal device 300 related to the present invention and a vibration state of the portable audio equipment 200 according to the gaming view.

In a baseball game, when a runner steps on the base due to a hit or a home run, a vibration pattern corresponding to the base may be generated. For example, when a home run occurs, a vibration pattern may be generated such that the vibration module 211-7 corresponding to the first base 611-1 and the vibration module 211-8 corresponding to the groove base 611-2 vibrate.

MODE FOR INVENTION

It will be apparent to those skilled in the art that the present invention can be embodied in other specific forms without departing from the spirit or essential characteristics thereof.

The foregoing detailed description is to be considered illustrative rather than limiting in all respects. The scope of the present invention should be determined by rational interpretation of the appended claims, and all changes within the scope of equivalents of the present invention are included in the scope of the present invention.

INDUSTRIAL APPLICABILITY

As described above, the features of the present invention are fully or partially applicable to all display devices.

What is claimed is:

1. A portable audio equipment comprising:
   a neckband-shaped housing opened on one side;
   a vibration unit comprising a plurality of vibration modules each provide in at least two areas corresponding to both sides of the housing,
   wherein the vibration unit comprises a first vibration module and a second vibration module, and
   a controller configured to:
   recognize a control signal containing information about a vibration pattern for each the plurality of vibration modules,
   control the plurality of vibration modules to output the vibration pattern, and
   control the first vibration module and the second vibration module according to a recognized control signal that the first vibration module outputs a first vibration pattern and the second vibration module outputs a second vibration pattern different from the first vibration pattern,
   wherein the vibration pattern is related to information about an event generated in an external terminal device, and
   wherein the second vibration pattern is generated a first time after an end of the first vibration pattern.

2. The portable audio equipment of claim 1, further comprising:
   a wireless communication unit wirelessly connected to the external terminal device to receive data,
   wherein the control signal is received from the external terminal device via the wireless communication unit.

3. The portable audio equipment of claim 1, wherein the control signal contains vibration pattern information for each of the plurality of vibration modules according to a number of the plurality of vibration modules and identification information for identifying each of the plurality of vibration modules, and
   wherein the identification information comprises information about relative locations in the housing.

4. The portable audio equipment of claim 1, wherein the vibration pattern comprises vibration intensity information corresponding to a time for each of the plurality of vibration modules.

5. The portable audio equipment of claim 1, wherein the vibration unit comprises:
   a left vibration module provided on a left side of the housing, and
   a right vibration module provided on a right side of the housing, and
   wherein the controller selectively controls the left vibration module and the right vibration module to vibrate according to the recognized control signal.

6. The portable audio equipment of claim 1, wherein the first vibration pattern corresponds to a type of the event generated in the external terminal device and the second vibration pattern corresponds to counterpart information about the event generated in the external terminal device.

7. The portable audio equipment of claim 1, wherein the vibration unit comprises the first vibration module, the second vibration module, and a third vibration module sequentially spaced apart from each other in a longitudinal direction of the housing, and wherein the controller controls the first vibration module, the second vibration module, and the third vibration module according to the recognized control signal so that the first vibration module, the second vibration module, and the third vibration module sequentially vibrate in order of the first vibration module, the second vibration module, and the third vibration module or in order of the third vibration module, the second vibration module, and the first vibration module.

8. The portable audio equipment of claim 7, wherein the recognized control signal comprises direction information, and wherein the controller determines a direction of the sequential vibration according to the direction information.

9. The portable audio equipment of claim 1, wherein the recognized control signal contains a plurality of level values, and wherein the controller performs a control operation to change a vibration intensity or vibration period of the vibration pattern according to the plurality of level values.

10. The portable, audio equipment of claim 9, wherein the event is an event of reproducing a sound source, and wherein a higher level value is assigned to a higher frequency band of the reproduced sound source among the plurality of level values, and the vibration pattern has a shorter vibration period for the higher level value.

11. The portable audio equipment of claim 9, wherein the event is included in a navigation application, and wherein, as an arrival time taken from a current location to a position at which a turn needs to be made to move on the navigation application decreases, a higher level value is assigned, and the vibration pattern has a shorter vibration period for the higher level value.

12. The portable audio equipment of claim 9, wherein the event is included in a navigation application, and wherein, as a require turn angle on the navigation application increases, a higher level value is assigned, and the vibration pattern has a higher vibration intensity fOr the higher level value.

13. The portable audio equipment of claim 12, wherein the controller outputs a vibration pattern for sequentially vibrating the plurality of vibration modules in a direction corresponding to a required turn direction on the navigation application.

14. The portable audio equipment of claim 9, further comprising:

a location information module configured to sense a change in location, wherein the control signal varies a level value among the plurality of level values according to a degree of the change in location corresponding to time.

15. The portable audio equipment of claim 14, wherein, as the degree of the change in location corresponding to time increases, a higher level value is assigned.

16. The portable audio equipment of claim 1, further comprising:

a location information module configured to sense a change in location; and a wireless communication unit wirelessly connected to the external terminal device to receive data, wherein the controller receives, via the wireless communication unit, a light intensity measured by an illumination sensor provided in the external terminal device, and wherein, when the measured light intensity is less than or equal to a preset value and a degree of the change in location corresponding to time is less than or equal to a preset value, the controller outputs a vibration pattern having a vibration intensity less or equal to a preset value or a vibration period less or equal to a preset value.

17. The portable audio equipment of claim 1, wherein the controller outputs the first vibration pattern when the event generated in the external terminal device satisfies a preset condition, and outputs the second vibration pattern when the event does not satisfy the preset condition.

18. The portable audio equipment of claim 1, wherein the external terminal device comprises a plurality of external terminal devices, the portable audio equipment further comprising a wireless communication unit wirelessly connected or wirelessly connectable to the plurality of external terminal devices, and wherein the vibration pattern has a different vibration pattern depending on a wirelessly connected external terminal device among the plurality of external terminal devices or has a different vibration pattern depending on an activated external terminal device among a plurality of wirelessly connected external terminal devices.

19. The portable audio equipment of claim 1, further comprising:

a motion sensor configured to recognize an orientation;

a location information module configured to recognize a location; and a wireless communication unit wirelessly connected to the external terminal device to receive data, wherein the controller receives location information about the external terminal device having the generated event via the wireless communication unit, and controls a vibration module located in a direction corresponding to the external terminal device having the generated event to output the vibration pattern, based on the location information about the external terminal device having the generated event, the location recognized through the location information module, and the orientation recognized through the motion sensor.

* * * * *